(12) United States Patent
Lewis

(10) Patent No.: US 7,274,677 B1
(45) Date of Patent: Sep. 25, 2007

(54) NETWORK MANAGEMENT ARCHITECTURE

(75) Inventor: Michael E. Lewis, Hartville, OH (US)

(73) Assignee: Cisco Technology, Inc., San Jose, CA (US)

( * ) Notice: Subject to any disclaimer, the term of this patent is extended or adjusted under 35 U.S.C. 154(b) by 1083 days.

(21) Appl. No.: 10/006,046

(22) Filed: Dec. 5, 2001

Related U.S. Application Data

(63) Continuation of application No. 09/835,648, filed on Apr. 16, 2001, now abandoned.

(51) Int. Cl.
 H04Q 7/00 (2006.01)
 H04Q 7/28 (2006.01)
 H04B 7/00 (2006.01)
 H04B 1/00 (2006.01)

(52) U.S. Cl. .................. 370/330; 370/310.2; 370/341; 455/63.4

(58) Field of Classification Search ................ 370/231, 370/235, 229, 230, 321, 312, 395.21, 329, 370/337, 458, 336, 468, 395.4; 455/450, 455/453, 509, 516
See application file for complete search history.

(56) References Cited

U.S. PATENT DOCUMENTS

| | | | | |
|---|---|---|---|---|
| 5,642,353 A | * | 6/1997 | Roy et al. | 370/329 |
| 5,886,988 A | * | 3/1999 | Yun et al. | 370/329 |
| 5,894,472 A | * | 4/1999 | de Seze | 370/337 |
| 6,456,608 B1 | * | 9/2002 | Lomp | 370/335 |
| 6,593,880 B2 | * | 7/2003 | Velazquez et al. | 342/367 |
| 6,999,771 B1 | * | 2/2006 | Kasapi et al. | 455/450 |
| 2003/0067903 A1 | * | 4/2003 | Jorgensen | 370/338 |

* cited by examiner

Primary Examiner—Hanh Nguyen
(74) Attorney, Agent, or Firm—Tucker Ellis & West LLP

(57) ABSTRACT

A network management architecture is disclosed having a network backbone and one or more macro service areas. Each macro service area includes one or more basic service areas, which each include an access point and a plurality of associated clients. A management system is employed for connecting the access points to the network backbone. The management system regulates access of the clients to the network so as to control a desired network parameter, which can relate to throughput, quality of service, or any other desired network parameter.

7 Claims, 5 Drawing Sheets

DMLQ-DUAL-MULTILEVEL QUEUE
EMAC-ETHERNET MAC

NETWORK MANAGEMENT ARCHITECTURE

CROSS-REFERENCE TO RELATED APPLICATIONS

This is a continuation of U.S. Ser. No. 09/835,648, filed Apr. 16, 2001 now abandoned.

BACKGROUND OF THE INVENTION

The present invention is directed to the field of network management. The invention has particular applicability to the improvement of a desired performance metric in a wireless communication network. A typical wireless network includes a plurality of wireless clients such as laptop computers and cellular phones that exchange data packets with a network backbone via a radio card. These clients gain access to the network backbone by way of an access point (AP), such as a wireless base station, connected to the network by a hardwired connection or a fixed Ethernet connection.

The advantage of a wireless network is that clients are mobile units that can vary in position (such as with wireless laptop computers) or can even be in motion while in use (such as with cellular telephone service.) However, these wireless clients have only a finite range wherein the base station may be accessed. Beyond that range, a client cannot maintain a connection to the base station. Consequently, in order to cover a large area, a number of such access points are required so as to maintain service to the clients. At any given time, an AP serves a number of clients in a unit called a Basic Service Set (BSS) and the region served is called a Basic Service Area (BSA).

As mobile clients vary in position, each BSA has an ever changing topology of wireless connections. However, due to regulatory frequency allocations, there is not enough available spectrum to insure that each client can gain access to the network at the same time. A number of schemes are known to permit clients to share access through an AP within a BSA. However, it may happen that multiple BSA's can be on the same channel, producing interference from "packet collisions" that break the network, resulting in "packet drops". Other reductions in quality-of-service (QoS) can occur such as packet delay and packet jitter, which can also lead to packet drops.

In order to reduce interference from packet collisions in a wireless network, access can be controlled using a distributed coordination function (DCF), which relies on "carrier sense, multiple access collision avoidance" (CSMA/CA). With DCF control, each AP and client radio listens to the air and waits a random amount of time for the air to clear. If the air is then clear, the radio transmits a packet. In this manner, network access is regulated through statistics. This technique is found to statistically provide a modest reduction in packet collisions, though not altogether preventing collisions. The principle drawback is that only one BSA can be on the air at a time, since frequency bandwidth is restricted by FCC regulations. Consequently, the network throughput of BSA's sharing the air is fixed and is divided by the number of radios on the common channel. As the number of AP's and clients sharing the air is increased, access is further diluted, resulting in increased packet collisions and a significant waste of bandwidth.

As shown in FIG. 1A a typical DCF control uses an AP with an omni-directional antenna 10, which transmits and receives in a 360 degree radiation pattern to access all the associated clients. As shown in FIG. 1B, the problems with DCF control are partially ameliorated by the use of an adaptive directional antenna 20 having a narrow radiation pattern 22 that can be varied so as to be selectively directed to each client in the BSA. The adaptive directional antenna 20 can be an array of antennas with rapid switching therebetween.

This adaptive directional antenna 20 can be used in a point coordination function control (PCF) to perform time division, multiple access (TDMA) rather than CSMA/CA. In fact, adaptive antennas are better used by PCF, which offers improvement in QoS. With PCF, every client 24 is assigned a time slot by the AP in a predetermined manner in which the AP queries the clients, and receives a packet or transmits a packet. PCF is superior DCF in that access can be regulated and prioritized to reduce packet drop outs from packet collisions and other QoS problems resulting from queuing issues, such as packet delays and packet jitter. PCF control works especially well for real-time communications such as voice traffic.

However, PCF control creates complications in a wireless network where multiple BSA's share the same channel. AP's work independently, with no communication between each other. Consequently, interference can still occur between radios in different BSA's, especially if they lie along the same line of sight. FIG. 1C shows adjoining BSA's A, B having respective AP's $20a$, $20b$, each connected to a network backbone 30. The AP $20a$ of BSA A can be in contact with a client $24a$ while in line of sight with a client $24b$ associated with the BSA B. Interference can result if both cells (AP's and clients) become active at the same time, especially if e.g. AP $20a$ transmits to client $24a$ while client $24b$ transmits to AP $20b$. As the clients are mobile, the network topology is always changing.

SUMMARY OF THE INVENTION

In view of the difficulties and drawbacks associated with previous network architectures, there is therefore a need for a network management system that reduces interference between BSA's in a PCF-controlled network.

There is also a need for a network management system that improves quality of service factors.

There is also a need for a network management system that increases network throughput.

These needs and others are satisfied by the present invention in which a network includes a network backbone and one or more macro service areas. Each macro service area includes one or more basic service areas, which each include an access point and a plurality of associated clients. A management system is employed for connecting the access points to the network backbone. The management system regulates access of the clients to the network so as to control a desired network parameter, which can relate to throughput, quality of service, or any other desired network parameter.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

As shown in detail in the figures, a wireless network is disclosed having a centralized control for managing traffic of client data packets through the network. In this way, optimized network operation is maintained, to improve throughput and/or another performance metric such as the factors related to improving quality of service.

Figure 1A:
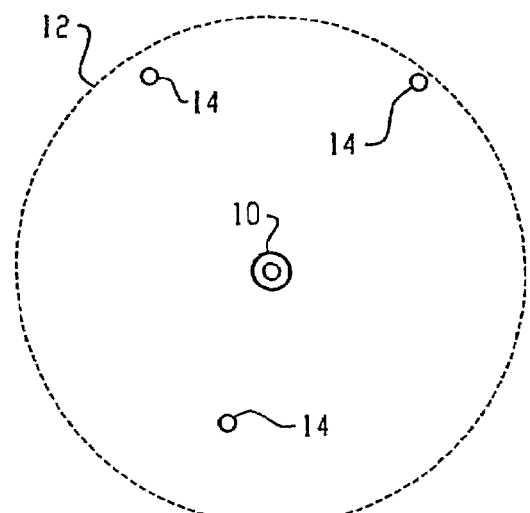
FIGS. 1A, 1B and 1C respectively show AP's with an omni directional antenna, an adaptive directional antenna, and a pair of adjoining BSA's in a network.
Figure 1B:
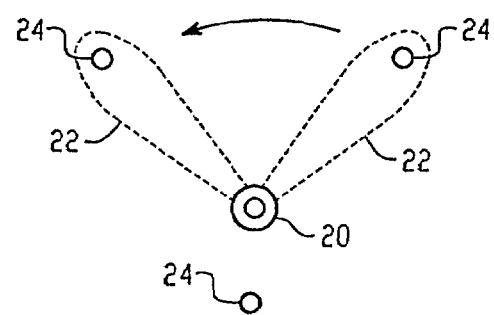
Figure 1C:
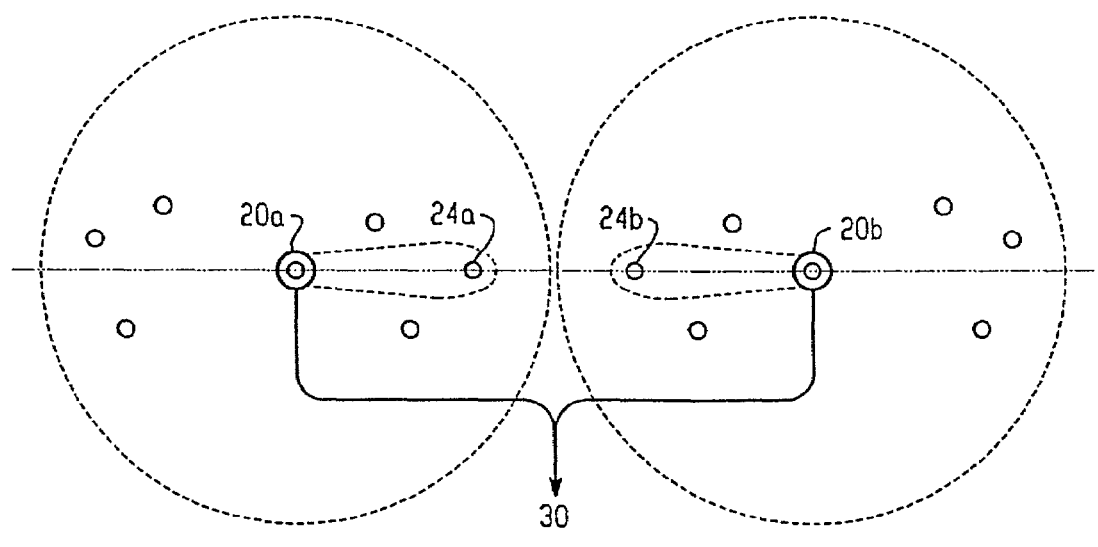
Figure 2A:
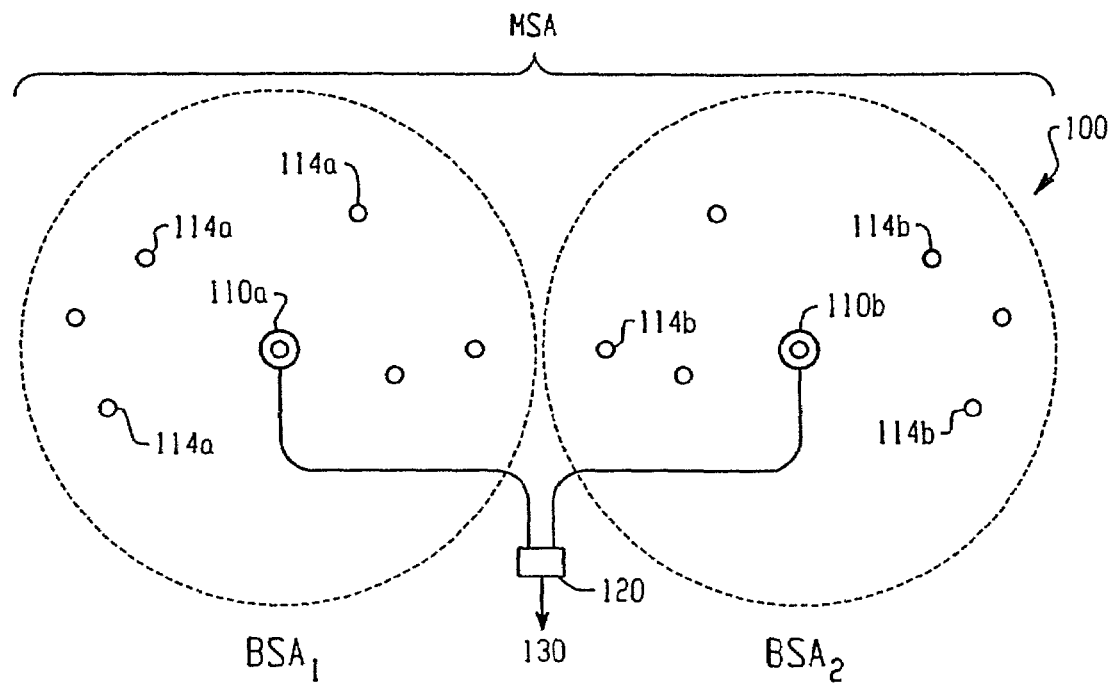
FIGS. 2A and 2B depict a macro service area in accordance with the present invention.

As shown in FIG. 2A, a wireless network 100 includes adjoining $BSA_1$ and $BSA_2$, potentially having at least a portion of channel overlap (i.e. frequency and spatial). Each $BSA_{1,\,2}$ includes an access point 110a, 110b that communicates with clients 114a, 114b, preferably using an adaptive directional antenna or antenna array in a PCF control scheme. A management system 120 is employed to connect the AP's 110a, 110b to the network backbone 130, in order to define a macro service area (MSA). In a MSA, the management system 120 controls the BSA's so as to minimize co-channel interference. In an MSA, the management system 120 instructs the AP's 110a, 110b to regulate client access in an efficient manner for specific network topologies, loads and QoS requirements. An MSA can manage many network variables, including time division, buffering, bandwidth, frequency and space. In the preferred embodiments, an adaptive control algorithm would be employed that would manage these network variables in view of the changing parameters and requirements of the network. It should be noted that FIG. 2A shows an MSA serving only two BSA's, with a small number of clients. It should be appreciated that this and the other figures are only given for illustrative purposes, and any number of BSA's and/or respective clients could be contemplated without departing from the invention.

Figure 2B:
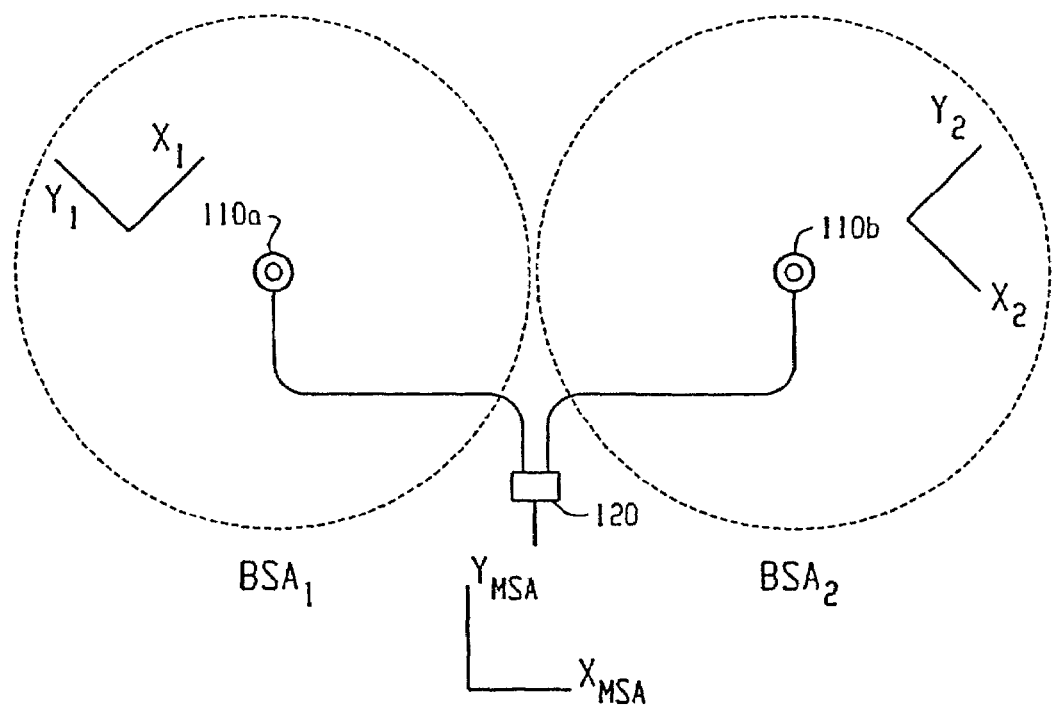

In order to coordinate and prioritize network traffic from a number of clients in different BSA'S, the algorithm of the management system 120 operates with a goal function to optimize a desired network metric. As shown in FIG. 2B, each BSA can be assigned a unique coordinate system. In principle, when a client associates with a particular BSA, the respective AP 110a, 110b calculates the directions of arrival for the client signal with respect to its coordinate system. The management system 120 must transform those coordinate systems to its own MSA coordinate system, e.g. to reference the locations of origins and rotation of the reference axes. However, due to limiting factors such as measurement error, perfect coordinate transformation data may not be obtainable. Thus, the algorithm must be adaptive in order to operate with imperfect or transient information.

Figure 6A:
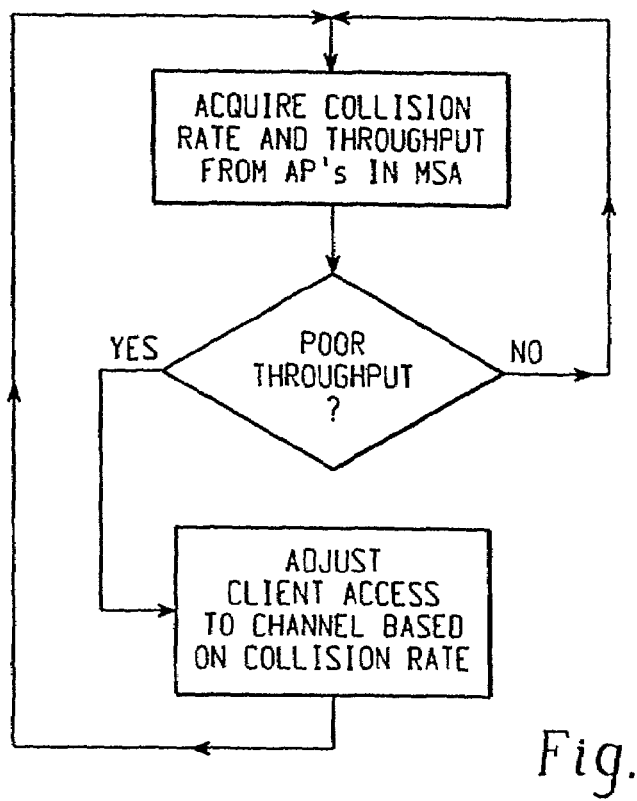
FIGS. 6A and 6B are flow charts indicating alternative methods for implementing the present algorithm.

Preferably, the algorithm functions to control a particular desired network parameter. Specifically, the algorithm preferably operates with a goal function or metric that seeks to approach an extremum of a network parameter. For example, in a DCF network, using an omni-directional antenna, it would be sufficient to use temporal access techniques to manage time. The algorithm may optionally direct the AP's 110a, 110b to control access of clients to the channel so as to maximize network throughput. In such a case, the goal function is the network throughput in bits per second and the algorithm seeks the assignment of clients to appropriate time slots in such a manner that the throughput is maximized. In operation the algorithm would determine the clients that can be on the air at the same time by observing previous network packet collision history and adjust the client to specific time slots. As shown in FIG. 6A, this method could be implemented by acquiring collision rate and throughput data from the APs in a MSA. If poor throughput is determined, the algorithm adjusts client access to the network to reduce the collision rate.

It may also be desirable to manage time and space in a PCF network using an adaptive antenna. A wireless network of four AP's each having a throughput of 10 Mbps each AP could be simultaneously accessing clients by managing space via an adaptive antenna, with respective client time division multiple accesses on each AP selected to avoid simultaneous access between potentially interfering clients.

Figure 6B:
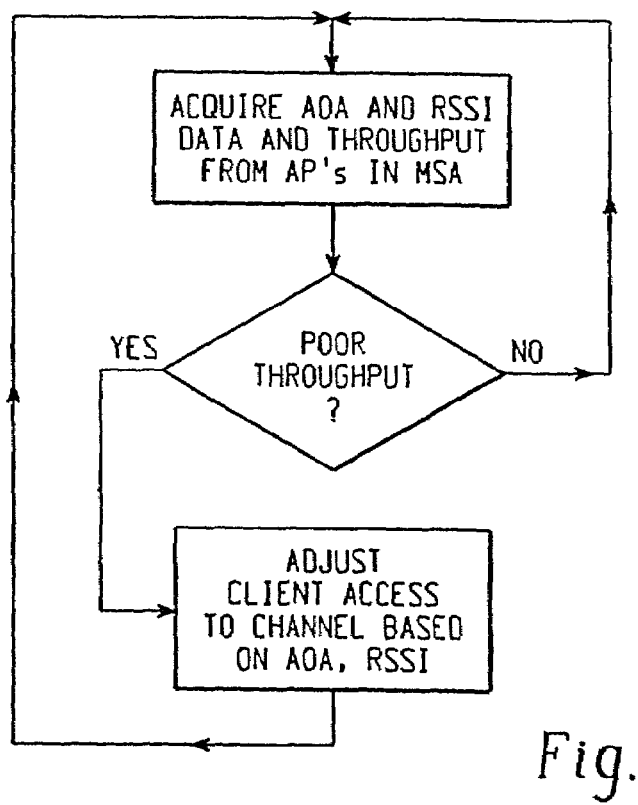

In another case, the algorithm would use packet angle-of-arrival information to determine which particular clients could access the channel at the same time using an adaptive antenna array and beam/null forming methods. (Beam/null forming is the computation of orthogonal (non-interfering) antenna array patterns which can be used by the AP to place more than one client on the same time slot of the same channel at the same time on the same frequency.) The goal function could be the maximizing of network throughput or minimization of packet jitter. As shown in FIG. 6B, the method can be implemented by acquiring angle-of-arrival (AOA), RSSI and throughput data from the APs in the MSA, and adjusting client access to the network in response to these factors. By using an adaptive antenna to manage space and time, network throughput would approach the maximum 40 Mbps, as compared with only 10 Mbps available on a competing DCF network.

Current wireless network trends indicate increasing demands for "real-time" wireless service, e.g. cellular telephone voice communications. Thus, the algorithm of the present invention may operate with a metric that seeks to improve one or more quality of service parameters. For example, queuing between multiple AP's may result in packet delays. This can result in packet drop out in a real-time voice message. Also, packet jitter may occur if packets arrive too soon or too late. The present management algorithm may be tailored to a metric that seeks to minimize packet jitter and packet delay by granting priority access to real time packets, resulting in the timely sequential arrival of those packets, thereby improving network QoS.

The present algorithm of the network management system 120 could be realized by a number of implementations. For example, an associative neural net could be used, or a root mean square error program could be used. Also, a number of artificial intelligence schemes could be employed. Some exemplary implementations are given as follows. In one example, we assume a simple case where AP's are on a regular grid, AP's are oriented on a regular grid, preferably employing TDMA operation. Using an antenna system whereby it is possible to service a particular area around a given AP, consider the positional topological arrangements for covering the total service area given the requirements that it is desired that more than one client be serviced at a time from each AP at any time slot. This means that by monitoring the positions for a given placement of AP's and clients for a desired type of antenna technology, there will be a finite number of topological arrangements that can be constructed that permit, on average, the AP's in the network to allow network access more than one client per TDMA time slot. These distinct topological arrangements could be preprogrammed into the main management program if the AP's are oriented and placed on a regular grid. Access to the network can then be regulated for each topology to improve network performance, e.g. maximize network throughput.

Figure 7:
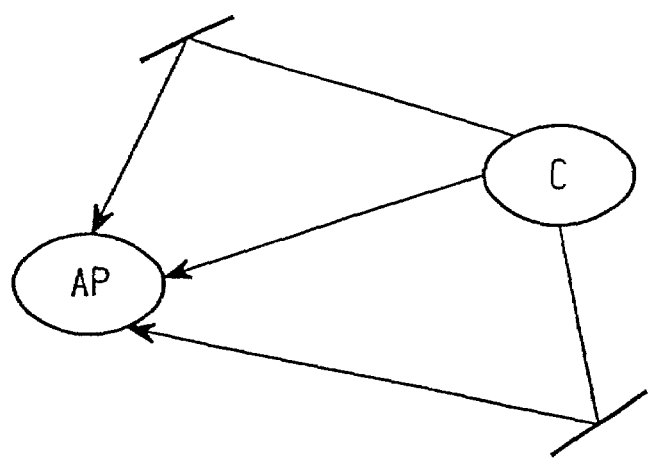
FIG. 7 depicts multipath and angle-at-arrival as employed with the present method.

In a real system where the RF channel is less than ideal and there are significant amounts of multipath, some topological arrangements would be unusuable. This cannot be determined from the geometrical information provided by the placement grid and the AP orientations. However, this could be derived from direct measurement or by trial and error as the network is in operation. In the latter case the main controller could conduct a network calibration routine. During this phase the main controller could instruct a particular AP to transmit in a particular direction while all other AP's "listen" (or detect the signal). The listening AP's would record the received signal strength and direction of arrival of the signal and report them to the main controller. This process would be repeated until all AP's and the paths between them were calibrated. This could also be done for the associated clients within the network. They also could be constructed to both transmit and listen and report their information back to the main controller. After this process the main controller could fairly accurately determine the allowable topological configurations. Well known algorithms such as "MUSIC" or "ESPRIT" could be used to calculate the "angles of arrival" (AOA's). As shown in FIG. 7, each client associated with an AP has well defined signal propagation paths between itself and the AP, each having a specific angle of arrival with respect to the AP or client, which ever is in receive mode. One direct and two reflected paths are shown for transmission from client to AP. Each path approaches the AP along a unique direction. These angles are the angles of arrival.

The above mentioned calibration process could also be used on a system where the AP's were neither oriented nor placed in positions known to the main controller. The calibration procedure could indicate relative directions which along with the relative received signal strength and path delays could provide a reasonably accurate picture of the actual placement of the AP's. This could be accomplished by Joint Angle and Delay Estimation (JADE).

Over a period of time, the configuration of the network would change and some topological arrangements would no longer be viable. In this case the main controller would have to modify the management routine and select a modified set of topologies to assign the various TDMA time slots. The information coming into the main controller could consist of several items, in particular, orientation of clients being serviced relative to the AP to which it is associated, priority of traffic flowing to and from the clients, the level of performance provided to the client, including:

a. Data rate used;
 b. Numbers of retries;
 C. The topological configurations used when talking to the client; and
 d. Other items such as would occur to those skilled in the art.

By knowing the topological configurations used while servicing a particular client the main controller could try other configurations that would possibly eliminate the new multipath interference caused by having certain clients on the air at the same time.

Figure 3:
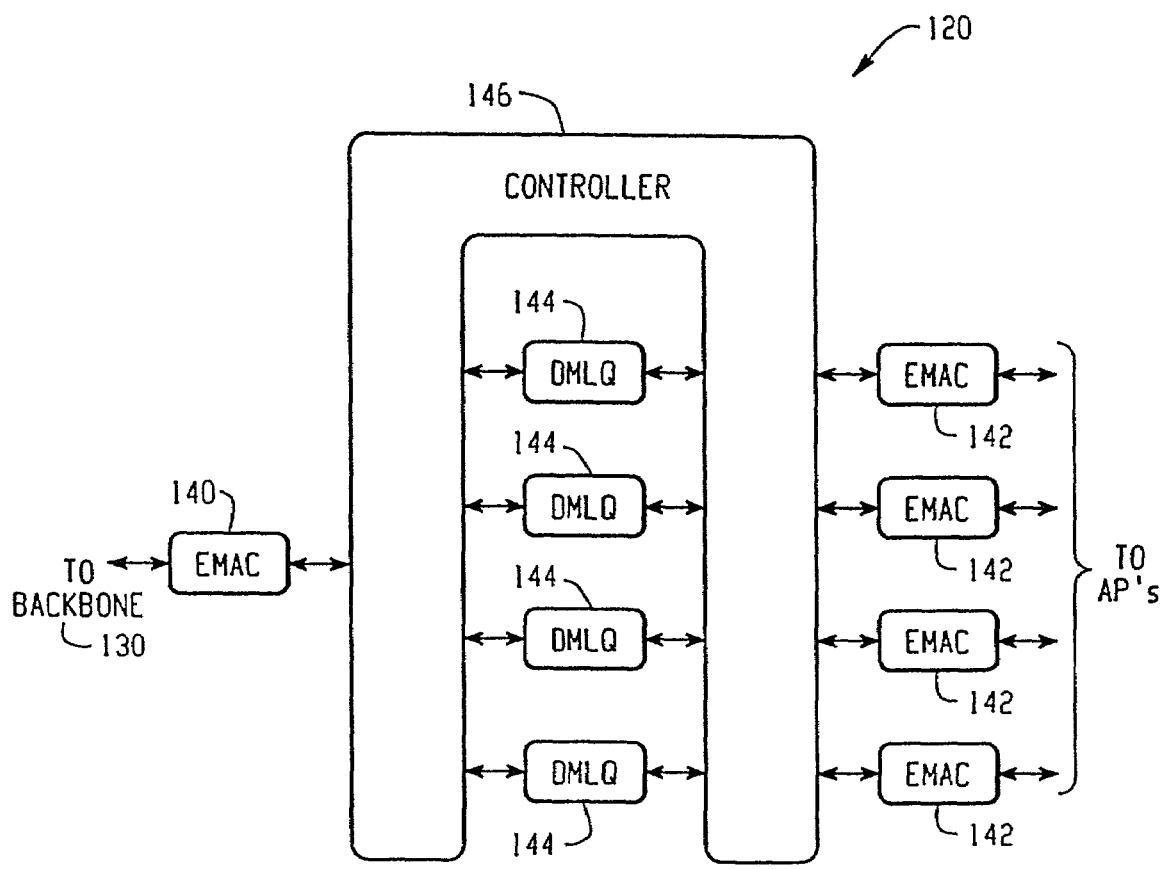
FIG. 3 depicts a first embodiment of a management system according to the present invention.
Figure 4:
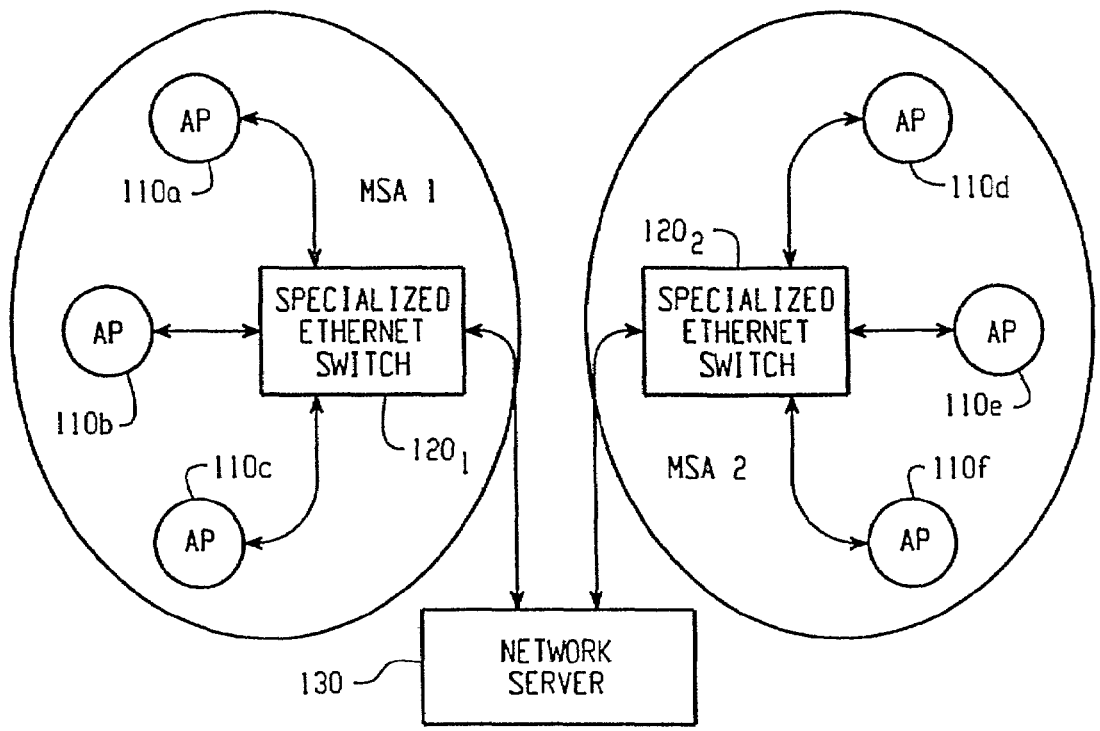
FIG. 4 illustrates an extended multiple MSA network using the management system shown in FIG. 3.

The present MSA management system 120 can be implemented in several ways, two implementations are contemplated hereinbelow. In a first preferred embodiment, the management system 120 is an enhanced Ethernet switch. In the second preferred embodiment, a particular AP is designated as the MSA controller 120 for a specifically assigned group of BSA's. A general switch architecture of the first preferred embodiment is shown in FIG. 3. FIG. 4 shows the overall network architecture using this switch. A high speed Ethernet media access a controller (EMAC) 140 is connected to a wired network backbone 130. Several additional EMAC's 142 are provided for sending and receiving data from AP's in the managed BSA's. Additionally, there are provided dual multi-level queues (DMLQ) 144 for each EMAC data path to handle incoming and outgoing packets of varying priority according to the system QoS requirements. Lastly, a controller 146, which can be a Power PC or another type of dedicated processor, would regulate the data flows between the network backbone 130 and the controlled AP's. To fully support the more advanced QoS methods the switch 120 would preferably handle Reservation Protocol (RSVP) and its extension, subnet bandwidth management (SBM) as well as be 802.1p and 802.1Q compliant.

For such an arrangement it is possible to accomplish complete control over the AP's connected to the switch 120. For purposes of clarity, it is useful to assume that all the BSA's in this MSA are on the same frequency. As shown in FIG. 4, such a situation might arise if several MSA's ($MSA_1$, $MSA_2$) were required to cover a particular enterprise installation and all available channels were assigned to the different MSA's to prevent them from interfering with one another. In such a configuration, all BSA's in a respective MSA would interfere with one another if permitted access to the channel at the same time. This may not be the case in all environments since it may be possible for more than one AP to access the channel at one time by proper channel allocation. Under these conditions each respective switch $120_1$, $120_2$ would control the timing of when each AP (110a, 110b, 110c, 110d, 110e, 110f) accesses the channel. In the case where all BSA's have the same QoS requirements and similar traffic patterns all that would be necessary is a sequential servicing of each respective BSA. In the case where QoS needs were unequally divided between BSA's the switch could effectively adapt since it has direct control of the priority queues for each AP and is completely informed as to the QoS requirements of each BSA from the state of the priority queues. Due to centralized control and complete knowledge of network resource usage, the switch 120 could accurately allocate resources and determine when to admit new data streams. In the case of a very large enterprise or very large public WLAN installations it may be necessary to implement many MSA's, some of which may be on the same frequency and interfere if permitted to access the shared medium at the same time. In this case another level of management would be needed. A similar switch that runs a modified control algorithm could provide this functionality. This could actually be accomplished with the same product jumpered or programmed to manage MSA's.

Figure 5:
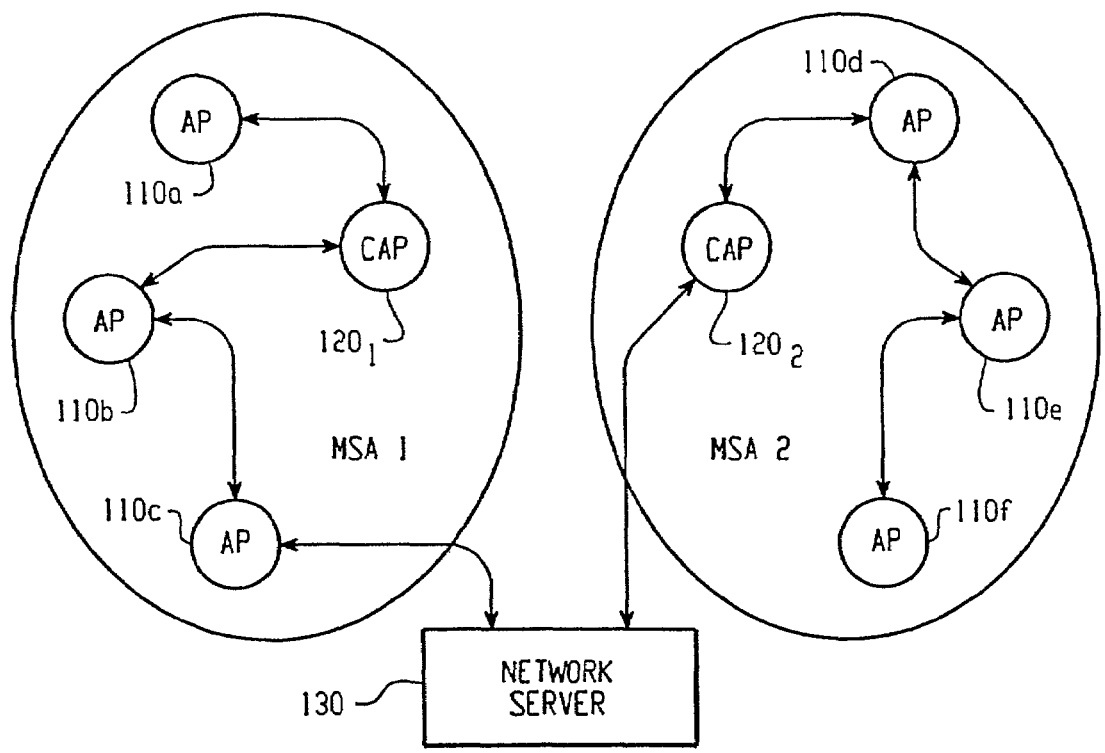
FIG. 5 illustrates a multiple MSA network using a second embodiment of the management system according to the present invention.

Referring now to FIG. 5, a schematic of the network architecture is indicated for designated AP control of an MSA. In this implementation, a unique AP within an MSA is selected to be the MSA controller. During operation, this control AP $120_1$, $120_2$ (CAP) manages its own traffic in addition to the traffic of all other AP's within its respective MSA. All priority buffering is done at each AP within the MSA, hence the CAP $120_1$, $120_2$ is not directly aware of the QoS needs of its MSA. The CAP is informed of the network load and QoS requirements and manages resources within the MSA by receiving requests for extra bandwidth from the various AP's which it controls over the existing network backbone 130. The CAP $120_1$, $120_2$, based on the current MSA status, would either allow or deny access to the channel. This is done by changing the times and rates at which the controlled AP's could access the channel. Note that all AP's within the MSA must be informed of the new channel access times and service rates, as the variables change in a transient, mobile network.

By controlling the network as discussed above, many possibilities arise that can significantly increase network performance. In the above, we have discussed the ability of the MSA controller to control at what time and for how long and at what rate the AP's can be serviced. This level of control significantly improves the QoS when coupled with RSVP/SBM and 802.1p/Q. However, it is also possible to control frequency and space if more complicated network architectures are admitted, particularly if adaptive directional antenna control is provided at the AP's. This would be especially useful when all BSA's within a given MSA must be on the same frequency. In this case, "spatial domain multiple access" (SDMA) would be possible and would permit more than one AP access to the channel at a time. This could have a dramatic impact on network throughput and hence QoS.

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

I claim:

1. A method of network management comprising:
providing a central controller for controlling network access of a first access point having a respective first plurality of associated clients and a second access point having a second plurality of associated clients;
monitoring packet angle-of-arrival information to determine a location for the first plurality of clients and the second plurality of clients;
determining a first client selected from the first plurality of associated clients and a second client selected from the second plurality of associated clients that can use a channel concurrently;
controlling the direction of an adaptive antenna array associated with one of the group consisting of the first access point and the second access point to allow simultaneous access between the first client and the second client based on their respective location determined during the monitoring packet angle of arrival information; and
scheduling a time slot with the first access point for the first client and with the second access point for the second client;
wherein the first client and second client use the same time slot and same channel concurrently; and
wherein the controlling the direction uses one of the group consisting of adaptive beam forming and adaptive null forming to compute an orthogonal antenna array pattern.

2. The method of claim 1, further comprising:
monitoring a plurality of network parameters that influence parameters between the first plurality of clients and the first access point and the second plurality of clients and the second access point; and
wherein the step of monitoring network parameters comprises monitoring one of the group consisting of time division, buffering, bandwidth, frequency, space and throughput.

3. The method of claim 1, further comprising:
monitoring network packet collision history; and
adjusting client access to specific time slots based on the packet collision history.

4. The method of claim 1 wherein the step of controlling the direction of an adaptive antenna array further comprises simultaneously managing time by selecting client time division multiple accesses on the first and second access points to allow simultaneous access between potentially interfering clients.

5. A method of network management comprising:
providing a central controller for controlling network access of a first access point having a respective first plurality of associated clients and a second access point having a second plurality of associated clients;
determining a first client selected from the first plurality of associated clients and a second client selected from the second plurality of associated clients that can use a channel concurrently;
scheduling a time slot with the first access point for the first client and with the second access point for the second client;
instructing the first access point to transmit a signal in a desired direction;
detecting the signal using the second access point;
reporting to a main controller received signal strength and direction of arrival detected by the second access point; and
determining a network access topology to reduce multipath interference between the first plurality of clients and the second plurality of clients;
wherein the first client and second client use the same time slot and same channel concurrently.

6. The method of claim 5, further comprising:
monitoring a plurality of network parameters that influence parameters between the first plurality of clients and the first access point and the second plurality of clients and the second access point; and
wherein the step of monitoring network parameters comprises monitoring one of the group consisting of time division, buffering, bandwidth, frequency, space and throughput.

7. The method of claim 5, further comprising:
monitoring network packet collision history; and
adjusting client access to specific time slots based on the packet collision history.

* * * * *